US009022551B2

(12) United States Patent
Abe et al.

(10) Patent No.: US 9,022,551 B2
(45) Date of Patent: May 5, 2015

(54) TRANSPORTATION DEVICE AND RECORDING APPARATUS

(71) Applicant: Seiko Epson Corporation, Tokyo (JP)

(72) Inventors: Takahiro Abe, Shiojiri (JP); Mitsutaka Ide, Shiojiri (JP); Tomoya Murotani, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/073,799

(22) Filed: Nov. 6, 2013

(65) Prior Publication Data

US 2014/0132687 A1 May 15, 2014

(30) Foreign Application Priority Data

Nov. 9, 2012 (JP) ................................ 2012-247148

(51) Int. Cl.

| | |
|---|---|
| ***B41J 2/01*** | (2006.01) |
| *B41J 11/00* | (2006.01) |
| *B41J 29/38* | (2006.01) |
| *H04N 1/04* | (2006.01) |

(52) U.S. Cl.

CPC .......... *B41J 11/0085* (2013.01); *B41J 11/0095* (2013.01)

(58) Field of Classification Search

CPC ...... B41J 11/0045; B41J 11/007; B41J 11/06; B41J 11/0085; B41J 11/08; B41J 11/10; B41J 13/0009–13/0036; B41J 13/10; B41J 13/103; B41J 13/226

USPC ...................... 347/16, 104; 400/582; 358/486

See application file for complete search history.

(56) References Cited

U.S. PATENT DOCUMENTS

| | | | | |
|---|---|---|---|---|
| 5,797,597 | A | 8/1998 | Kakuta et al. | |
| 6,038,776 | A * | 3/2000 | Yamada et al. | 33/18.1 |
| 6,860,665 | B2 * | 3/2005 | Elgee et al. | 400/634 |

(Continued)

FOREIGN PATENT DOCUMENTS

| | | |
|---|---|---|
| DE | 102009032966 | 1/2011 |
| EP | 1449668 | 8/2004 |
| JP | 10-228226 | 8/1998 |
| JP | H11-91293 | 4/1999 |
| JP | 2003-285480 | 10/2003 |
| JP | 2005-017641 | 1/2005 |
| JP | 2008-162153 | 7/2008 |
| JP | 2009-113350 | 5/2009 |
| JP | 2009-160895 | 7/2009 |

OTHER PUBLICATIONS

European Search Report for European Patent Application No. 13191809.6 dated Jan. 30, 2014.

*Primary Examiner* — Jannelle M Lebron
*Assistant Examiner* — Jeremy Bishop
(74) *Attorney, Agent, or Firm* — Workman Nydegger

(57) ABSTRACT

A transportation device includes a transportation unit that transports a transportation target material, a supporting surface that supports the transported transportation target material, a first suction hole that opens in the supporting surface in order to suck the transportation target material which is supported by the supporting surface, a light transmission portion that is exposed in the supporting surface and through which light is permitted to pass, a detector that has a light irradiator capable of irradiating the transportation target material which is supported by the supporting surface with light through the light transmission portion and detects a transportation amount of the transportation target material based on reflected light of the light with which the light irradiator has irradiated the transportation target material, and a second suction hole that opens in the supporting surface at least one of the positions adjacent to the light transmission portion.

8 Claims, 3 Drawing Sheets

(56) References Cited

U.S. PATENT DOCUMENTS

| | | | | |
|---|---|---|---|---|
| 8,047,976 | B2 * | 11/2011 | Holbrook et al. | 493/13 |
| 8,091,891 | B2 | 1/2012 | Meyer | |
| 8,619,320 | B2 * | 12/2013 | Watanabe | 358/1.5 |
| 8,628,261 | B2 * | 1/2014 | Taniguchi | 400/582 |
| 2003/0085980 | A1 | 5/2003 | Ishii et al. | |
| 2004/0252353 | A1 | 12/2004 | Sano et al. | |
| 2010/0254744 | A1 | 10/2010 | Taniguchi | |
| 2013/0127943 | A1 * | 5/2013 | Abe | 347/16 |
| 2013/0135407 | A1 * | 5/2013 | Abe | 347/102 |
| 2013/0141487 | A1 * | 6/2013 | Abe | 347/16 |
| 2014/0118450 | A1 * | 5/2014 | Abe et al. | 347/102 |

* cited by examiner

TRANSPORTATION DEVICE AND RECORDING APPARATUS

BACKGROUND

1. Technical Field

The present invention relates to a transportation device that transports a transportation target material such as paper that is used for printing or the like, for example, and a recording apparatus including the transportation device.

2. Related Art

Known is an existing ink jet printer that ejects ink onto paper (transportation target material) from a recording head (recording unit) so as to form an image, as one type of recording apparatuses (for example, JP-A-2003-285480). In the printer as disclosed in JP-A-2003-285480, a plurality of suction holes (first suction holes) are provided in a recording medium transportation surface (supporting surface) along which the paper is transported, and the paper is sucked through the suction holes so as to be sucked onto the recording medium transportation surface. Then, ink is ejected onto the paper from the recording head in a state where the paper is sucked onto the recording medium transportation surface, so that printing is performed.

Further, there is a printer including an image capturing device (detector) for detecting a transportation amount of the paper that is transported on the recording medium transportation surface among the above-mentioned printers. In such a printer, the image capturing device captures the surface state of the paper that is transported on the recording medium transportation surface as continuous images. Further, the image capturing device compares two adjacent images captured in chronological order and calculates movement amounts of a focused pattern in the respective images. Then, the image capturing device integrates the movement amounts so as to calculate the transportation amount of the paper.

In the above-mentioned printer including the image capturing device, a window (light transmission portion) for capturing an image of the paper that is transported on the recording medium transportation surface from a non-printed surface side (rear side) needs to be provided in the recording medium transportation surface. Therefore, a suction hole cannot be provided in a region of the recording medium transportation surface in which the window is provided. As a result, a force of sucking the paper onto the recording medium transportation surface is weak in the region of the recording medium transportation surface in which the window is provided. This raises a problem that a posture of the paper on the recording medium transportation surface is unstable.

SUMMARY

The invention has been made in view of the problem present in the existing technique. An advantage of some aspects of the invention is to provide a transportation device and a recording apparatus that are capable of stabilizing a posture of a transportation target material on a supporting surface even when a light transmission portion through which light is permitted to pass is provided on the supporting surface supporting the transportation target material.

Hereinafter, described are methods and action effects thereof for solving the above-mentioned problem.

A transportation device according to an aspect of the invention includes a transportation unit that transports a transportation target material, a supporting surface that supports the transportation target material which is transported by the transportation unit, a first suction hole that opens on the supporting surface in order to suck the transportation target material which is supported by the supporting surface, a light transmission portion that is exposed on the supporting surface and through which light is permitted to pass, a detector that has a light irradiator capable of irradiating the transportation target material which is supported by the supporting surface with light through the light transmission portion and detects a transportation amount of the transportation target material based on reflected light of the light with which the light irradiator has irradiated the transportation target material, and a second suction hole that opens in the supporting surface at least one of positions adjacent to the light transmission portion at both sides of the light transmission portion in a transportation direction of the transportation target material.

With this configuration, the transportation target material is sucked through the second suction hole, so that the force of sucking the transportation target material is ensured even in the light transmission portion. Accordingly, even when the light transmission portion through which light is permitted to pass is provided in the supporting surface that supports the transportation target material, a posture of the transportation target material on the supporting surface can be made stable.

In the transportation device according to the above-mentioned aspect of the invention, it is preferable that the second suction hole open in the supporting surface at each of the positions adjacent to the light transmission portion at both sides of the light transmission portion in the transportation direction of the transportation target material.

With this configuration, the transportation target material is sucked through the second suction holes, so that the force of sucking the transportation target material is ensured even in the light transmission portion sufficiently. Accordingly, even when the light transmission portion through which light is permitted to pass is provided in the supporting surface that supports the transportation target material, the posture of the transportation target material on the supporting surface can be made stable.

In the transportation device according to the above-mentioned aspect of the invention, it is preferable that the second suction hole oppose the detector in a direction in which the transportation target material which is supported by the supporting surface is sucked through the second suction hole.

With this configuration, the air (air flow) that is generated when the transportation target material is sucked through the second suction hole hits the detector to thus cool the detector with the air.

In the transportation device according to the above-mentioned aspect of the invention, it is preferable that the light irradiator be arranged toward an end portion of the detector at the side of the second suction hole.

With this configuration, the air (air flow) that is generated when the transportation target material is sucked through the second suction hole can cool the light irradiator in the detector, in particular.

A recording apparatus according to another aspect of the invention includes the transportation device having the above-mentioned configuration, and a recording unit that performs recording processing on the transportation target material which is transported by the transportation unit.

With this configuration, action effects same as those obtained by the above-mentioned transportation device can be obtained.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment in which a recording apparatus is embodied as an ink jet printer will be described with reference to the drawings.

Figure 1:
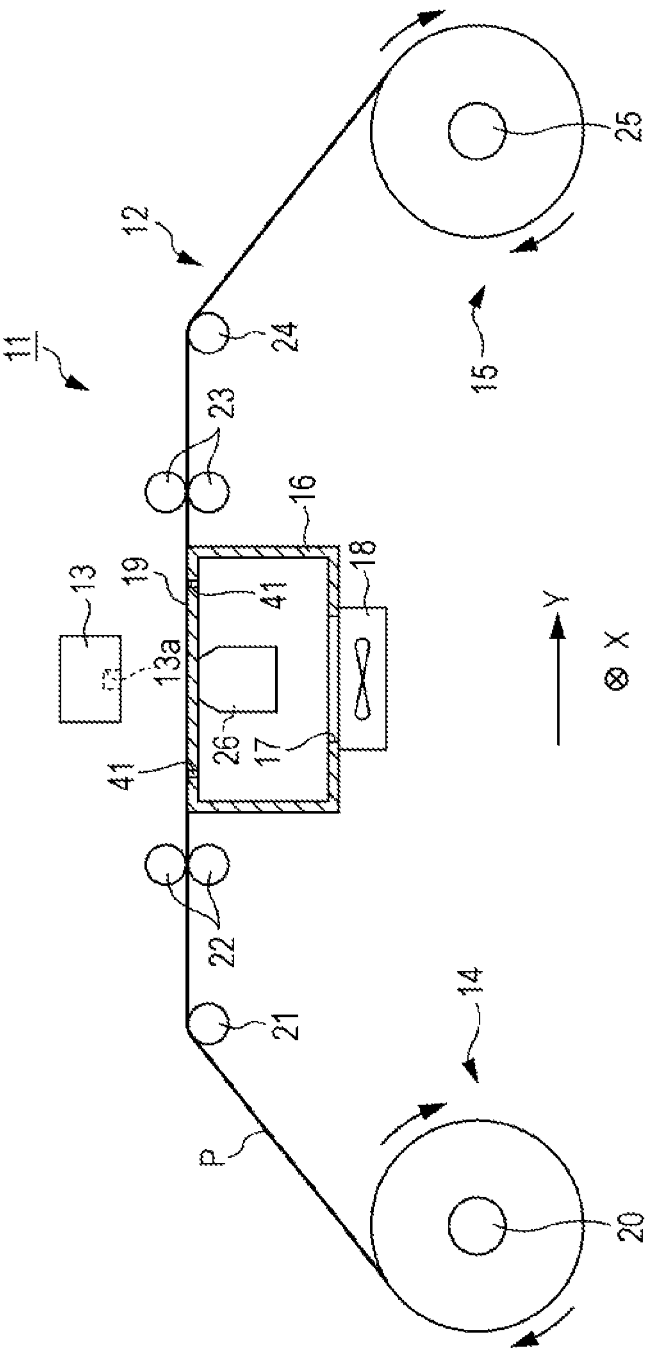
FIG. 1 is a schematic configuration diagram illustrating an ink jet printer according to an embodiment.

As illustrated in FIG. 1, an ink jet printer 11 serving as an example of a recording apparatus includes a transportation device 12, and a recording head 13 serving as an example of a recording unit. The transportation device 12 transports long sheet-like continuous paper P serving as an example of a transportation target material. The recording head 13 ejects ink (liquid) onto the continuous paper P that is transported by the transportation device 12 to perform printing (recording processing). The transportation device 12 includes a feed-out unit 14 and a winding unit 15. The feed-out unit 14 feeds out the continuous paper P. The winding unit 15 winds up the continuous paper P that has been fed out from the feed-out unit 14 and on which printing has been performed by the recording head 13.

That is to say, in FIG. 1, the feed-out unit 14 is arranged at the left side position at the upstream side in the transportation direction Y (right direction in FIG. 1) of the continuous paper P. The winding unit 15 is arranged at the right side position at the downstream side. The recording head 13 is arranged between the feed-out unit 14 and the winding unit 15 so as to oppose a transportation path of the continuous paper P. A plurality of nozzles 13*a* for ejecting ink onto the transported continuous paper P are formed in the surface of the recording head 13, which opposes the transportation path of the continuous paper P.

A supporting member 16 is arranged at a position opposing the recording head 13 with the transportation path of the continuous paper P interposed therebetween. The supporting member 16 supports the continuous paper P. The supporting member 16 has an opening 17 in the lower surface side opposite to the recording head 13 side and has a rectangular parallelpiped box shape with a bottom. A suction fan 18 is provided on the lower surface of the supporting member 16 so as to cover the opening 17. The suction fan 18 sucks an inner portion of the supporting member 16. A surface of the supporting member 16, which opposes the recording head 13, serves as a horizontal supporting surface 19 that supports the transported continuous paper P.

As illustrated in FIG. 1, a feed-out shaft 20 is provided in the feed-out unit 14 in a rotationally driving manner. The feed-out shaft 20 extends in the width direction X (direction orthogonal to a paper plane in FIG. 1) of the continuous paper P, which is orthogonal to the transportation direction Y of the continuous paper P. The continuous paper P is supported on the feed-out shaft 20 so as to be rotatable integrally with the feed-out shaft 20 in a state where the continuous paper P is wound therearound in a roll form previously. If the feed-out shaft 20 is driven rotationally, the continuous paper P is fed out from the feed-out shaft 20 to the downstream side in the transportation path.

A first relay roller 21 is arranged at an obliquely upper right position of the feed-out shaft 20 in a rotatable manner. The first relay roller 21 is a roller that winds the continuous paper P fed out from the feed-out shaft 20 thereon and guides the continuous paper P to the recording head 13 side. A feeding roller pair 22 is arranged at the downstream side of the first relay roller 21 in the transportation path of the continuous paper P. The feeding roller pair 22 is driven rotationally so as to guide the continuous paper P to the upper side of the supporting surface 19 while nipping the continuous paper P that is transported from the first relay roller 21 side.

A discharge roller pair 23 is arranged at the downstream side of the supporting surface 19 in the transportation path of the continuous paper P. The discharge roller pair 23 is driven rotationally so as to guide a printed region of the continuous paper P to the downstream side in the transportation path of the continuous paper P from the position above the supporting surface 19 while nipping the continuous paper P. A second relay roller 24 is arranged at the downstream side of the discharge roller pair 23 in the transportation path of the continuous paper P in a rotatable manner. The second relay roller 24 is a roller that winds the continuous paper P transported from the discharge roller pair 23 side thereon and guides the continuous paper P to the winding unit 15. The winding unit 15 is located at an obliquely lower right position of the second relay roller 24.

A winding shaft 25 is provided in the winding unit 15 in a rotationally driving manner. The winding shaft 25 extends in the width direction X of the continuous paper P, which is orthogonal to the transportation direction Y of the continuous paper P. The winding shaft 25 is driven rotationally so as to wind the printed continuous paper P that is transported from the second relay roller 24 side by the winding shaft 25.

Figure 2:
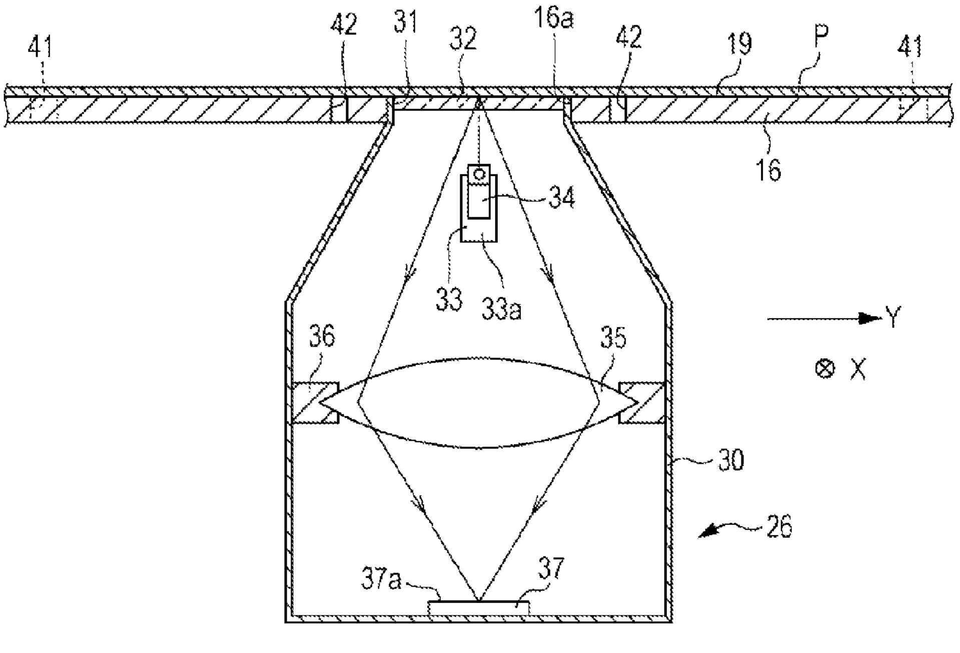
FIG. 2 is a cross-sectional view schematically illustrating an image capturing unit of the printer.

As illustrated in FIG. 1 and FIG. 2, a through-hole 16*a* penetrating the supporting member 16 is formed at the center portion of the supporting surface 19. An image capturing unit 26 is fixed to the supporting member 16 in a state where an upper end portion thereof is inserted into the through-hole 16*a*. The image capturing unit 26 is an example of a detector for detecting the transportation amount of the continuous paper P in a non-contact manner. In this case, the image capturing unit 26 is arranged inside the supporting member 16. The image capturing unit 26 includes a control circuit (not illustrated) that controls the image capturing unit 26 as a whole.

In the embodiment, the feeding roller pair 22 and the discharge roller pair 23 constitute a transportation unit that transports the continuous paper P.

Next, a configuration of the image capturing unit 26 will be described in detail.

As illustrated in FIG. 2, the image capturing unit 26 includes a case 30 having a quadrangular cylindrical shape with a bottom. An upper portion of the case 30 is configured into a tapered form so as to have a narrower width toward the upper end. The case 30 is fixed to a fixing portion (not illustrated) in a state where the upper end portion thereof is inserted into the through-hole 16*a* formed in the supporting member 16 from the inner side of the supporting member 16. In this case, the upper end of the case 30 is flush with the supporting surface 19 of the supporting member 16.

A rectangular opening in the upper end of the case 30 is formed as a detection window 31 exposed in the supporting surface 19. A colorless transparent light-transmissive glass 32 through which light is permitted to pass is fitted in the detection window 31. In the embodiment, the detection window 31 and the light-transmissive glass 32 constitute a light transmission portion. The upper surface of the light-transmissive glass 32 is arranged at a position slightly lower than the supporting surface 19.

That is to say, as illustrated in FIG. 2, the light-transmissive glass 32 is arranged so as to oppose the continuous paper P that is transported on the supporting surface 19 at the upper and lower sides in a state where a slight space is provided therebetween. Accordingly, the light-transmissive glass 32 has difficulty in making contact with the continuous paper P. Therefore, when the continuous paper P is transported, the continuous paper P is not easily scratched and so on due to making contact with the light-transmissive glass 32.

The height of the upper surface of the light-transmissive glass 32 may be the same as that of the supporting surface 19 or may be slightly higher than that of the supporting surface 19. In this case, a step due to the difference in height between the upper surface of the light-transmissive glass 32 and the supporting surface 19 is not generated. Alternatively, even when the step is generated, the supporting surface 19 is lower than the upper surface of the light-transmissive glass 32. Accordingly, contaminants (dusts) such as paper powder do not easily accumulate on the upper surface portion of the light-transmissive glass 32. Therefore, the detection sensitivity of the image capturing unit 26 is not easily lowered.

Further, a rectangular supporting plate 33 is provided on the inner circumferential surface of the upper end portion of the case 30 at one side in the width direction X of the continuous paper P. A light irradiator 34 is attached to an attachment surface 33*a* of the supporting plate 33, which is the surface at the detection window 31 side.

In the embodiment, the light irradiator 34 is formed by a light emitting diode (LED). The light irradiator 34 irradiates the continuous paper P that is transported on the supporting surface 19 with light from the lower surface side (non-printing surface side) opposite to the printing surface through the light-transmissive glass 32. In this case, the light irradiator 34 is arranged so as to irradiate the lower surface (non-printing surface) of the continuous paper P with light obliquely from the width direction X side.

A condensing lens 35 serving as an example of an optical member is provided in the case 30 at a position farther from the continuous paper P relative to the light irradiator 34, that is, provided in the case 30 at a lower position relative to the light irradiator 34. The condensing lens 35 is held on the inner circumferential surface of the case 30 through a holding member 36, and condenses reflected light. The reflected light is light that has been output from the light irradiator 34, has been transmitted through the light-transmissive glass 32, has been reflected by the lower surface of the continuous paper P, has been transmitted through the light-transmissive glass 32 again, and has entered the case 30.

Further, an image capturing element 37 having an image capturing surface 37*a* is provided in the case 30 at a position farther from the continuous paper P relative to the condensing lens 35, that is, on the inner bottom surface of the case 30. An image of the lower surface of the continuous paper P, which has been condensed by the condensing lens 35, is formed on the image capturing surface 37*a*. The image capturing element 37 is formed by a two-dimensional image sensor, for example.

The condensing lens 35 is held on the inner circumferential surface of the case 30 through the holding member 36. The condensing lens 35 is held at a height at which the image of the lower surface of the continuous paper P can be formed on the image capturing surface 37*a* of the image capturing element 37. In this case, the condensing lens 35 is arranged such that an optical axis thereof passes through the center of the detection window 31 and the center of the image capturing surface 37*a*.

Then, the image capturing unit 26 captures an image of texture (paper surface pattern) on the lower surface of the continuous paper P that is supported by the supporting surface 19 based on the reflected light of the light with which the light irradiator 34 has irradiated the continuous paper P and compares two adjacent images captured at a constant time interval so as to calculate a transportation amount of the continuous paper P per unit time. That is to say, the image capturing unit 26 detects the transportation amount of the continuous paper P based on the reflected light of the light with which the light irradiator 34 has irradiated the continuous paper P.

Next, a configuration of the supporting member 16 will be described in detail.

Figure 3:
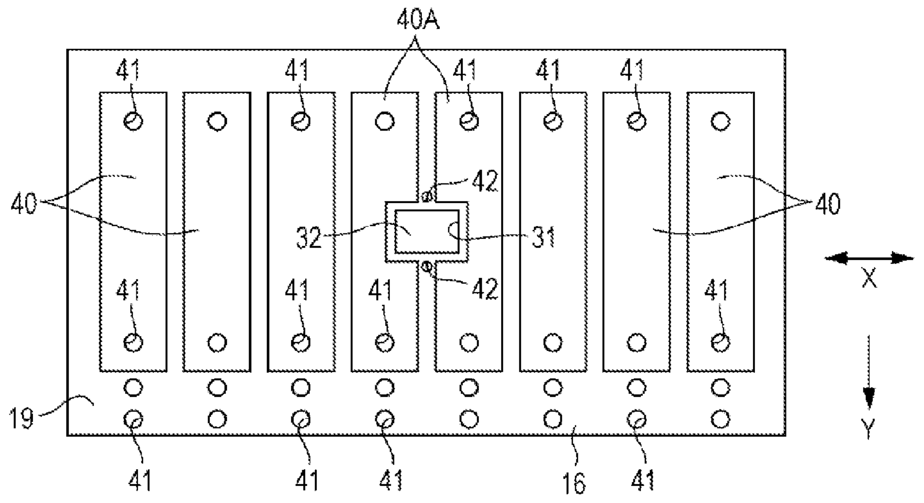
FIG. 3 is a plan view schematically illustrating a supporting member of the printer.

As illustrated in FIG. 2 and FIG. 3, a plurality of (in the embodiment, eight) rectangular recesses 40 that are elongated in the transportation direction Y of the continuous paper P are formed in the supporting surface 19 of the supporting member 16. The recesses 40 are formed at a constant interval along the width direction X of the continuous paper P. In the embodiment, the depth of each recess 40 is set to approximately 1 mm. The two adjacent recesses 40 located at the center in the width direction X among the recesses 40 are formed as central recesses 40A.

A portion of each central recess 40A, which corresponds to the light-transmissive glass 32 (detection window 31), is hollowed out in the width direction X so as to avoid the light-transmissive glass 32 exposed in the supporting surface 19. First suction holes 41 for sucking the continuous paper P that is supported by the supporting surface 19 are formed in the inner bottom surface of each recess 40 at respective end portions in the transportation direction Y. The first suction holes 41 are formed so as to penetrate the supporting member 16.

Further, two first suction holes 41 aligned in the transportation direction Y are formed in the supporting surface 19 at adjacent positions to each recess 40 at the downstream side. These first suction holes 41 are formed so as to penetrate the supporting member 16. Accordingly, it can be said that the first suction holes 41 open in the supporting surface 19. Further, one second suction hole 42 is formed in the supporting surface 19 at each of positions adjacent to the light-transmissive glass 32 at both sides of the light-transmissive glass 32 in the transportation direction Y of the continuous paper P. The second suction holes 42 are formed at positions between the central recesses 40A. Each second suction hole 42 has a diameter smaller than that of the first suction hole 41. The second suction holes 42 are formed so as to penetrate the supporting member 16.

Accordingly, it can be said that the second suction holes 42 open in the supporting surface 19. In this case, an interval between the second suction holes 42 in the transportation direction Y of the continuous paper P is set to be smaller than an interval between the first suction holes 41 in each recess 40 in the transportation direction Y of the continuous paper P. Further, in this case, the distance between the second suction holes 42 in the transportation direction Y of the continuous paper P is larger than the width of the detection window 31 in the transportation direction Y of the continuous paper P, and is smaller than the width of the detection window 31 in the width direction X of the continuous paper P.

As illustrated in FIG. 1 to FIG. 3, when the suction fan 18 is driven, an inner portion of the supporting member 16 is sucked and negative pressure is generated. The continuous paper P that is transported on the supporting surface 19 is sucked through the first suction holes 41 and the second suction holes 42 with the negative pressure so as to be sucked onto the supporting surface 19. Accordingly, in the embodiment, the direction in which the continuous paper P on the supporting surface 19 is sucked by the suction fan 18 through the first suction holes 41 and the second suction holes 42 matches the gravity force direction (direction to the lower side from the upper side). The suction direction changes in accordance with the inclination degree of the supporting surface 19 relative to the horizontal plane, positional relationship among the image capturing unit 26, the supporting surface 19, and the continuous paper P, and the like, and is not limited to the gravity force direction.

As illustrated in FIG. 2 and FIG. 3, the interval of the second suction holes 42 in the transportation direction Y of the continuous paper P is smaller than the width of the image capturing unit 26 in the transportation direction Y of the continuous paper P. Accordingly, the second suction holes 42 oppose the image capturing unit 26 in the direction in which the continuous paper P on the supporting surface 19 is sucked through the second suction holes 42 by the suction fan 18. It is to be noted that the light irradiator 34 of the image capturing unit 26 is arranged toward an upper end portion in the case 30 at the second suction holes 42 side.

Next, described are actions of the ink jet printer 11 configured as described above.

As illustrated in FIG. 1 to FIG. 3, when the continuous paper P is printed on, the continuous paper P is transported from the upstream side to the downstream side along the transportation path in a state where the suction fan 18 is driven. Then, the continuous paper P is sucked by the suction fan 18 through the first suction holes 41 and the second suction holes 42 in the supporting surface 19 so as to be sucked onto the supporting surface 19. At this time, the negative pressure is generated in the space in each recess 40 due to the suction through the first suction holes 41. Therefore, the continuous paper P is sucked onto the supporting surface 19 uniformly due to the negative pressure.

Normally, the continuous paper P cannot be sucked onto a region of the supporting surface 19 in which the light-transmissive glass 32 is exposed. For this reason, the suction force of the suction fan 18, which acts on the continuous paper P, is insufficient in the region. As a result, there arises a problem that a posture of the continuous paper P on the supporting surface 19 becomes unstable.

In this respect, in the embodiment, the second suction holes 42 are provided at positions adjacent to the light-transmissive glass 32. Therefore, the suction force of the suction fan 18, which acts on the continuous paper P, is compensated in the region of the supporting surface 19 in which the light-transmissive glass 32 is exposed. Therefore, the force of sucking the continuous paper P onto the light-transmissive glass 32 can be ensured sufficiently. Accordingly, the posture of the continuous paper P on the supporting surface 19 becomes stable. Further, paper powder and dusts which have adhered to the light-transmissive glass 32 are sucked through the suction holes 42 so as to be removed by the suction through the suction holes 42 by the suction fan 18.

Then, ink is ejected onto the continuous paper P supported by the supporting surface 19 through the nozzles 13*a* in the recording head 13 while transporting the continuous paper P from the upstream side to the downstream side along the transportation path thereof, so that the continuous paper P is printed on. In this case, the image capturing unit 26 detects the transportation amount of the continuous paper P supported by the supporting surface 19 in a non-contact manner.

Then, when the image capturing unit 26 detects the transportation amount of the continuous paper P, first, the light irradiator 34 irradiates the lower surface of the continuous paper P with light through the entire light-transmissive glass 32. Then, the light with which the lower surface of the continuous paper P has been irradiated is reflected by the lower surface of the continuous paper P, and then, the reflected light is condensed by the condensing lens 35. With this, an image (texture image) of the lower surface of the continuous paper P is formed on the image capturing surface 37*a*.

The image of the lower surface of the continuous paper P, which has been formed on the image capturing surface 37*a*, is captured by the image capturing element 37. Then, two adjacent images of the lower surface of the continuous paper P, which have been captured at the constant time interval by the image capturing element 37, are compared. With this, the transportation amount of the continuous paper P per unit time is calculated (detected). At this time, the temperature of the image capturing unit 26 increases due to heat generated in the light irradiator 34, in particular.

However, in the embodiment, the air (air flow) that is generated with the suction of the continuous paper P through the second suction holes 42 hits the image capturing unit 26, so that the image capturing unit 26 is cooled with the air. In this case, the light irradiator 34 is located toward the end portion of the image capturing unit 26 at the second suction holes 42 side. Therefore, in particular, the light irradiator 34 is cooled effectively through the case 30 with the air that is generated with the suction of the continuous paper P through the second suction holes 42. Accordingly, reduction in lifetime of the light irradiator 34 formed by the light emitting diode (LED) due to heat generation is suppressed.

As described above, the following effects can be obtained with the embodiment described in detail.

1. In the transportation device 12, the second suction holes 42 open in the supporting surface 19 at positions adjacent to the light-transmissive glass 32 (detection window 31) at both sides of the light-transmissive glass 32 in the transportation direction Y of the continuous paper P. Therefore, the continuous paper P is sucked through the second suction holes by the suction fan 18, so that the force of sucking the continuous paper P onto the light-transmissive glass 32 can be ensured sufficiently. Accordingly, even when the light-transmissive glass 32 (detection window 31) through which light is permitted to pass is provided in the supporting surface 19 supporting the continuous paper P, the posture of the continuous paper P on the supporting surface 19 can be made stable sufficiently. In addition, the continuous paper P is sucked through the second suction holes by the suction fan 18. Therefore, paper powder and dusts which have adhered to the light-transmissive glass 32 are sucked through the suction holes 42 so as to be removed.

2. In the transportation device 12, the second suction holes 42 oppose the image capturing unit 26 in the direction (gravity force direction) in which the continuous paper P is sucked. Therefore, the air (air flow) that is generated when the continuous paper P is sucked through the second suction holes 42 hits the image capturing unit 26, so that the image capturing unit 26 can be cooled with the air.

3. In the transportation device 12, the light irradiator 34 is arranged toward the end portion (upper end portion) of the image capturing unit 26 at the second suction holes 42 side. Therefore, the light irradiator 34 in the image capturing unit 26, which is located closer to the second suction holes 42, in particular, can be cooled effectively through the case 30 with the air (air flow) that is generated when the continuous paper P is sucked through the second suction holes 42. Accordingly, reduction in lifetime of the light irradiator 34 formed by the light emitting diode (LED) due to heat generation can be suppressed.

Modifications

The above-mentioned embodiment may be modified as follows.

The light irradiator 34 is not necessarily arranged toward the end portion (upper end portion) of the image capturing unit 26 at the second suction holes 42 side.

The second suction holes 42 do not necessarily oppose the image capturing unit 26 in the direction (for example, gravity force direction) in which the continuous paper P is sucked.

Any one of two second suction holes 42 may be omitted.

The number and the size of the second suction holes 42 that open in the supporting surface 19 may be changed arbitrarily.

The recesses 40 in the supporting surface 19 may be omitted.

A heat sink may be provided on the supporting plate 33 supporting the light irradiator 34 so as to be exposed to the outside of the case 30, and the heat sink may be arranged so as to oppose the second suction holes 42. With this, the air (air flow) that is generated when the continuous paper P is sucked through the second suction holes 42 hits the heat sink, so that the light irradiator 34 can be cooled effectively through the heat sink.

A plurality of condensing lenses 35 may be arranged in the case 30.

The transportation target material is not limited to the continuous paper P and may be single paper.

The transportation target material may be a fabric, a plastic film, a metal foil, or the like as long as it has texture on the surface thereof.

The ink jet printer 11 may be a serial printer or a line printer.

In the above-mentioned embodiment, the recording apparatus may be fluid ejecting apparatuses that eject and discharge fluids (including liquids, liquid-like materials obtained by dispersing or mixing particles of a functional material in liquid, fluid-like materials such as gel (including solids which can be made to flow and be ejected as fluids)) other than ink so as to perform recording. For example, the recording apparatus may be liquid-like material ejecting apparatuses that eject liquid-like materials containing electrode materials or colorants (pixel materials) to be used for manufacturing liquid crystal displays, electroluminescent (EL) displays, or surface emitting displays in a form of dispersion or solution so as to perform recording. Further, the recording apparatus may be fluid-like material ejecting apparatuses that eject fluid-like materials such as gel (for example, physical gel) or powder and granular material ejecting apparatuses (for example, toner jet recording apparatus) that eject solids exemplified by powder materials (powder and granular materials) such as toner. The invention can be applied to any one of the fluid ejecting apparatuses. It is to be noted that the term "fluid" in the specification does not encompass fluids containing gas only conceptually. The fluids include liquids (inorganic solvents, organic solvents, solution, liquid-like resins, and liquid-like metals (metal melt), for example), liquid-like materials, fluid-like materials, powder and granular materials (including granular materials and powder materials) and the like.

The transportation device is not limited to a transportation device included in the recording apparatus that performs recording processing on the transportation target material and may be a transportation device included in various types of processing devices that perform arbitrary processing on the transportation target material.

The entire disclosure of Japanese Patent Application No. 2012-247148, filed Nov. 9, 2012 is expressly incorporated by reference herein.

What is claimed is:

1. A transportation device comprising:

a transportation unit that transports a transportation target material;

a supporting surface that supports the transportation target material which is transported by the transportation unit;

a first suction hole that is positioned in the supporting surface in order to suck the transportation target material which is supported by the supporting surface;

a light transmission portion that is exposed in the supporting surface and through which light is permitted to pass;

a detector that has a light irradiator capable of irradiating the transportation target material which is supported by the supporting surface with light through the light transmission portion and detects a transportation amount of the transportation target material based on reflected light of the light with which the light irradiator has irradiated the transportation target material; and a second suction hole that is positioned in the supporting surface adjacent to the light transmission portion at a first side of the light transmission portion in a transportation direction of the transportation target material, the second suction hole being offset from the first suction hole in the transportation direction of the target material.

2. The transportation device according to claim 1, wherein another second suction hole is positioned in the supporting surface adjacent to a second side of the light transmission portion in the transportation direction of the transportation target material.

3. The transportation device according to claim 1, wherein the second suction hole is opposed to the detector in a direction perpendicular to the supporting surface.

4. The transportation device according to claim 3, wherein the light irradiator is arranged toward an end portion of the detector at the side of the second suction hole.

5. A recording apparatus comprising:

the transportation device according to claim 1; and a recording unit that performs recording processing on the transportation target material which is transported by the transportation unit.

6. A recording apparatus comprising:

the transportation device according to claim 2; and a recording unit that performs recording processing on the transportation target material which is transported by the transportation unit.

7. A recording apparatus comprising:

the transportation device according to claim 3; and a recording unit that performs recording processing on the transportation target material which is transported by the transportation unit.

8. A recording apparatus comprising:

the transportation device according to claim 4; and a recording unit that performs recording processing on the transportation target material which is transported by the transportation unit.

* * * * *